Nov. 23, 1965  J. SOUTHWORTH, JR  3,219,488
REINFORCED COMBINATION SAFETY BLOW-OUT AND GAS PERMEABLE
MEMBRANE FOR ALKALINE GALVANIC CELLS
Filed Dec. 15, 1961

INVENTOR.
JAMES SOUTHWORTH, JR.
BY
ATTORNEY

United States Patent Office 3,219,488
Patented Nov. 23, 1965

3,219,488
REINFORCED COMBINATION SAFETY BLOW-OUT AND GAS PERMEABLE MEMBRANE FOR ALKALINE GALVANIC CELLS
James Southworth, Jr., Rocky River, Ohio, assignor to Union Carbide Corporation, a corporation of New York
Filed Dec. 15, 1961, Ser. No. 159,556
2 Claims. (Cl. 136—133)

This invention relates to an improved seal gasket for primary and secondary alkaline galvanic cells or batteries, and more particularly, it relates to a seal gasket having therein a reinforced combination safety blow-out and gas permeable membrane.

The chemical nature of many electro-chemical systems employed for the production of electricity is such that gas, usually hydrogen, is generated during storage and sometimes during or following service use. When sealed cell containers are employed, as is the case in certain primary and secondary cells, an uncontrolled build-up of gas-pressure within the sealed container should be avoided.

In the past, an excessive build up of pressure generally has been prevented by some sort of continuous venting means or by periodic release through valve systems. These means have included venting slits or apertures in gasket membranes or sealing gums which pass gas bubbles and then reform after release.

Alleviation of build-up gas pressures from alkaline cells has been found to be particularly difficult. Alkaline electrolytes are not easy to contain within a sealed container and they will creep along almost any sealing surface and contaminate the outside of the cell package. Accordingly, it has been the practice in order to prevent creepage and loss of electrolyte to seal the cell container very tightly. Obviously higher pressure build-ups are a direct result of tightly sealed cells, unless some means of escape is provided for any generated gases.

Most venting systems which have been devised, will satisfactorily relieve high gas pressures, but unfortunately they will in addition permit electrolyte leakage. For example, release valves which are intended to reseal after activation under pressure, are too easily fouled by caustic electrolyte salts. These salts are formed when caustic electrolyte, which has crept along the sealing surface of the valve, combines with the carbon dioxide in the air to form a carbonate. The carbonate salt cakes the valve surface and prevents proper resealing of the valve and more electrolyte will then leak through the partially opened valve. Other open venting means which have been devised to permit pressure release, all evidence comparable difficulties.

Co-pending patent application, U.S. Serial No. 11,082 filed on February 25, 1960, and now abandoned, in the name of R. Carmichael and W. A. Vulpio and which is the property of a common assignee along with the subject invention, discloses and claims means in a sealed cell or battery which permits continuous venting of any gas generated therein, while preventing any escape of electrolyte. These means consist of a combined safety blow-out and gas permeable membrane.

More specifically, the combined safety blow-out and gas permeable membrane of the above-identified co-pending patent application comprises a diffusion membrane which is an integral part of a plastic gasket used to seal an alkaline cell container. The membrane is designed to vent gases formed within the cell during normal shelf storage by diffusion of gas therethrough and to rupture rapidly upon excessive build-up of gases under abusive conditions, such as excessive overcharge, at pressures below the point at which the cell container is likely to explode. This integral membrane, which may be provided in the gasket by either proper molding procedures or machining, positively prevents any electrolyte leakage at this point.

While a complete discussion of the inter-relation between the venting function and the rupture function of the membrane will be found in the above-identified patent application, it may be stated in brief that in the design of any particular combined safety blow-out and gas permeable membrane, a number of variables must be taken into account.

The venting rate of the membrane is dependent upon the membrane material employed, the gas permeability of the material, the membrane area and its thickness, and the pressure differential across the membrane. It has been generally observed that the rate of gas transmission through the membrane of a given material under constant conditions is linear with increasing thickness up to about a thickness of .015 inch.

The blow-out or rupture function of the membrane is dependent upon the physical properties of the membrane material, such as tensile strength and elongation, and also the dimensions of the membrane, i.e., the area of the membrane surface under stress and the thickness of the membrane at its periphery, which is the point of localized stress when pressure is exerted upon the membrane. For any given material, the rupture pressure increases with increased thickness in the periphery of the membrane, and conversely decreases with increased membrane area. The operating or deflecting area for membrane rupture is the total area that will be deflected under stress, and deflection will occur at the thinnest section of the membrane.

Unfortunately, it has been observed that even though proper attention is paid to the above principles in providing a combined blow-out and gas permeable membrane as an integral part of a seal gasket, a number of such membranes have ruptured under a pressure which they had been designed to withstand. Investigation of such failures indicated that over a period of time, the gradual and normal build up of pressure which occurred within the cells, caused the necessarily thin membrane to stretch or cold flow. The stretching was found to have a weakening effect on the membrane and the cumulative effect of increasing pressure with an ever-weakening membrane was eventual rupture at pressures below the design pressures (which were calculated on short term high rate loading).

Accordingly, the principal object of this invention is to provide a combined blow-out and gas-permeable membrane, the designed venting rate and blow-out pressure of which will not be affected by the passage of time.

Broadly stated, the object of the invention is accomplished by backing up the seal gasket above the combination membrane with a metal washer which must be first displaced if the membrane is to stretch a detrimental amount. Since the flexural qualities of the metal washer are unaffected by the passage of time, the rupture pressure of the combination membrane will be stabilized.

The invention will be more readily understood by reference to the accompanying drawing, wherein.

Figure 1:
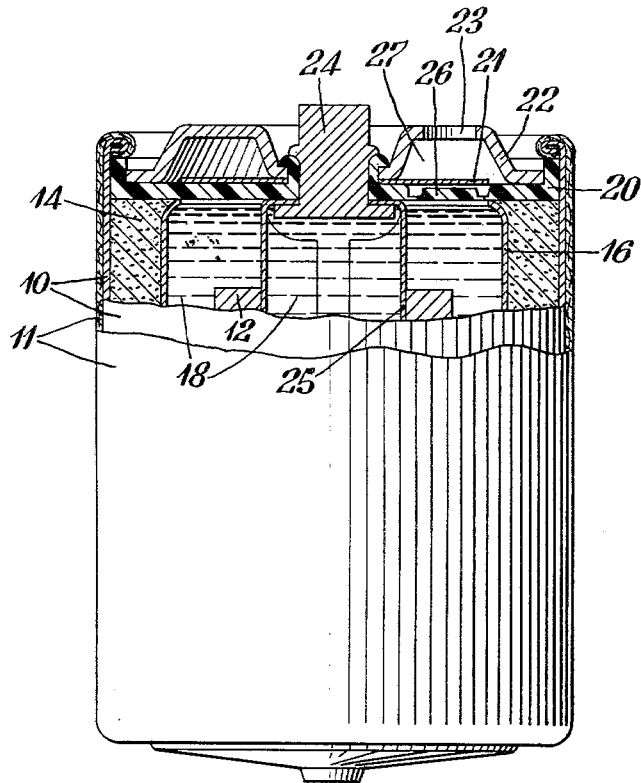
FIG. 1 is a front elevation, partially in section, of an alkaline manganese dioxide-zinc cell, illustrating the preferred embodiment of the invention.

Referring now to the drawing, FIG. 1 illustrates an alkaline manganese dioxide zinc cell which is sealed with the reinforced seal gasket of the invention. The cell comprises a cupped container 10, provided with an insulating jacket 11, having an anode 12 and cathode 14, separated by a separator 16 and electrolyte 18, disposed therein. The open-cupped polarized container 10 is sealed at its open end by an annular generally U shaped seal gasket 20, an unpolarized metallic cover 22 which resides in said U shaped gasket, and an oppositely polarized centrally located terminal rivet 24 which is in contact with an anode current collector 25. A metal washer 21 which is slightly spaced from the integral combination membrane 26 found in the gasket 20 is provided which overlays the major portion of the membrane 26. The cover 22 is provided with a bulge 27 above the metal reinforcement washer 21. In addition, the cover 22 is provided with a vent 23. The seal gasket 20 is radially compressed between the terminal 24 and the cover 22 and between the cover 22 and the container 10 thereby resulting in an extremely leak resistant gas tight cell.

Figure 2:
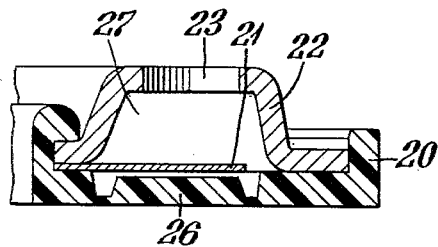
FIG. 2 is an enlarged fragmentary view of the reinforced seal gasket of the invention.

The combined gas permeable and safety blow-out membrane is an integral part of the seal gasket 20 and comprises, as is more readily seen in FIG. 2, a machined or molded membrance 26 located in the seal gasket 20. The seal gasket 20 may, of course, be provided with one or more membranes 26 according to requirements as disclosed in the above-referred to co-pending application.

Figure 3:
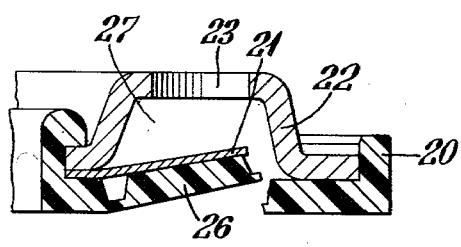
FIG. 3 is the reinforced seal gasket of FIG. 2 after rupture of the membrane.

As seen in FIG. 3, in order for the membrane 26 to be stretched to a detrimental degree and eventually to rupture, the yieldable metal washer 21 must also be displaced. When rupture does occur, the membrane 26 and washer 21 are displaced upward into the bulge 27 provided by the cover 22.

In cells employing the reinforced membrane of the invention, it may be desirable to provide an external insulator and a metallic cover, which is in electrical contact with the polarized terminal, in order to contain the cell elements in the event the cell ruptures.

It will thus be appreciated that the metal washer has a controlling and stabilizing effect on the blow-out or rupture pressure of the membrane. In designing the reinforced membrane of the washer the thickness of thinnest part of the membrane or the thickness of the metal washer or both may be varied to give the desired breaking point. While the rupture resistance offered by the membrane may possibly degrade with time, due to other causes such as a gain in moisture content which effects the strength of materials such as nylon; the portion of rupture resistance provided by the metal washer will not vary with the passage of time and accordingly, the provision of a more accurate rupture point is possible.

It has been determined that the blow-out pressure point of a .0075 inch thick diaphragm seal will be augmented by the amount set forth in the table below which lists various steel washer thicknesses.

*Table*

| Washer thickness inch: | Portion of blow-out resistance due to washer thickness pounds per square inch |
|---|---|
| .015 | 350 |
| .012 | 220 |
| .010 | 150 |
| .008 | 100 |

Thus, the total blow-out resistance may conveniently be varied by the use of various washer thicknesses.

In order to test the effectiveness of the invention, a number of cells were sealed with a reinforced seal gasket of the invention made of nylon. The membrane had a .0075 inch thickness at its rupture points and the membrane was reinforced with a .012 inch thick steel washer. As can be seen from the table, this thickness imparted a rupture resistance of about 220 p.s.i. of seal. The total resistance of the seal was designed to be 600 p.s.i. After one month, the pressure required to rupture the seal was found to be 600 to 625 p.s.i. and after seven months, a pressure of 550 to 575 p.s.i. was still required.

Of 150 cells sealed with an unreinforced nylon membrane which were designed to rupture at an internal pressure of 350 p.s.i., over 25% had ruptured after four months on the shelf. The unruptured cells were taken apart and the pressure required to rupture the membranes was determined. The average pressure required was found to be 160 p.s.i. with a minimum and maximum range of from 50 to 220 p.s.i. The average would have been considerably lower if it had been possible to determine the pressure at which the ruptured cells had blown.

I claim:

1. A galvanic cell comprising a cup-shaped container and a cell closure sealed in the open end of said container, said cell closure comprising an annular "U"-shaped seal gasket composed of a gas permeable material and having a central aperture therein, said seal gasket having at least one combined safety blow-out and venting membrane consisting of an integral portion of said gasket thinner than adjacent areas of said gasket, said membrane being sufficiently thin to effect a rupture at excessive pressures within said cell; a rigid annular cover disposed in the "U" of said gasket and having a venting aperture therein; a yieldable metallic washer disposed between said cover and said seal gasket in proximate spaced relation with the major portion of said membrane, thereby stabilizing the rupture pressure of said membrane; and a rivet extending through said central aperture and compressing said gasket between said cover and said rivet.

2. The galvanic cell defined in claim 1 wherein said gas permeable material is nylon and said washer is made of steel.

References Cited by the Examiner

UNITED STATES PATENTS

| 2,199,519 | 5/1940 | Collins et al. | 220—44 |
| 2,693,499 | 11/1954 | Neumann | 136—177 |
| 2,766,316 | 10/1956 | Stevens et al. | 136—133 |
| 3,042,734 | 7/1962 | Carmichael et al. | 136—133 |

WINSTON A. DOUGLAS, *Primary Examiner.*

JOHN R. SPECK, JOHN H. MACK, *Examiners.*